3,284,446
ORTHO-(5-TETRAZOLYL) PHENYLPENICILLINS
Raymond U. Lemieux and John Howard, Edmonton, Alberta, Canada, assignors to R & L Molecular Research Ltd., Edmonton, Alberta, Canada, a body corporate of Alberta
No Drawing. Filed Nov. 24, 1964, Ser. No. 413,645
7 Claims. (Cl. 260—239.1)

This invention relates to new synthetic compounds of value as antibacterial agents, as nutritional supplements in animal feeds, as agents for the treatment of mastitis in cattle and as therapeutic agents in poultry and animals, including man, in the treatment especially of infectious diseases caused by gram-positive bacteria and, more particularly, relates to ortho-(5-tetrazolyl)phenylpenicillins and nontoxic salts thereof.

It was a particular object of the present invention to provide alternative and improved agents for the treatment of infections caused by resistant strains of bacteria, e.g. benzylpenicillin-resistant strains of *Staphylococcus aureus* (*Micrococcus pyogenes* var. *aureus*) or for the decontamination of objects bearing such organisms, e.g. hospital equipment, walls of operating rooms and the like.

That objective was achieved by the provision, according to the present invention, of ortho-(5-tetrazolyl)phenylpenicillins, including their nontoxic, pharmaceutically acceptable salts, and more particularly by the provision of a member selected from the group consisting of an acid of the formula

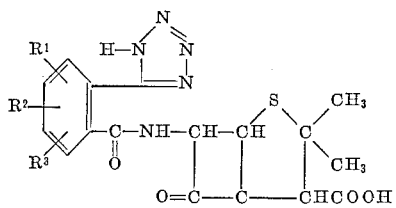

wherein $R^1$, $R^2$ and $R^3$ each represent a member selected from the group consisting of hydrogen, fluoro, chloro, bromo, iodo, trifluoromethyl, (lower)alkyl, (lower)alkoxy, methylenedioxy, nitro, methylsulfonyl and (lower)alkylmercapto; and nontoxic pharmaceutically acceptable salts thereof.

The preferred embodiments of the present invention are the free acid and its salts of which the free acid has the formula

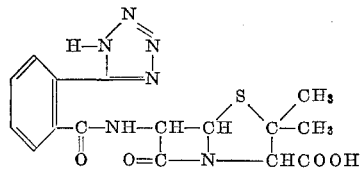

and is named, for example, 6-[ortho-(tetrazol-5-yl)benzamido]penicillanic acid or ortho-(5-tetrazolyl)phenylpenicillin or 2-(5'-tetrazolyl)phenylpenicillin. When tested in vitro as its salt with two molecules of triethylamine, this compound exhibited great activity against two strains of *Staph. aureus* which are highly resistant to benzylpenicillin, i.e. showed a Minimum Inhibitory Concentration versus strains BX1633-2 and 52-75 of 6.25 mcg./ml. This was a most surprising finding in view of the fact that the isomeric ortho-(1-tetrazolyl)phenylpenicillin when prepared and tested as its salt with one molecule of triethylamine exhibited against the same two strains an M.I.C. of about 50 mcg./ml.

The di-triethylamine ortho-(5-tetrazolyl)phenylpenicillin of the present invention was found to contain the β-lactam structure as shown by infrared analysis, to exhibit versus *Staph. aureus* BX-1633-2 upon intramuscular injection in mice a $CD_{50}$ of about 27 mgm./kg. and to reduce leg diameter of infected mice in comparison with that of infected, untreated mice, when administered intramuscularly once daily for two days, at doses as low as 11 mgm./kg./day in the Selbie test as modified by Hunt (G. A. Hunt and A. J. Moses, Subacute Intramuscular Staphylococcus Infection of the Mouse Leg for Drug Evaluation, Antimicrobial Agents and Chemotherapy—1962, pages 87–99, Braun-Brumfield, Inc, Ann Arbor, Michigan). In the same test oxacillin was effective at a dosage of 33 mgm./kg./day but ineffective at 11 mgm./kg./day.

The nontoxic, pharmaceutically acceptable salts include metallic salts such as sodium, potassium, calcium and aluminum, the ammonium salts and substituted ammonium salts, e.g. salts of such nontoxic amines as trialkylamines, including triethylamine, procaine, dibenzylamine, N-benzyl-beta-phenethylamine, 1-ephenamine, N,N'-dibenzylethylenediamine, dehydroabietylamine, N,N'-bis-dehydroabietylethylenediamine, N-(lower)alkylpiperidines, e.g. N-ethylpiperidine, and other amines which have been used to form salts with benzylpenicillin. The term "(lower)alkyl" as used herein means both straight and branched chain aliphatic hydrocarbon radicals having from one to ten carbon atoms such as methyl, ethyl, propyl, isopropyl, butyl, isobutyl, t-butyl, amyl, hexyl, 2-ethylhexyl, heptyl, decyl, etc. Also included within the scope of the present invention are easily hydrolyzed esters and amides which are converted to the free acid form by chemical or enzymatic hydrolysis.

The products of the present invention are prepared by the reaction of 6-aminopenicillanic acid, preferably in the form of a neutral salt such as the sodium salt or the triethylamine salt, with an acid chloride having the formula

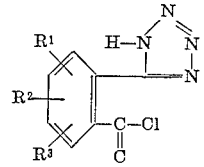

wherein $R^1$, $R^2$ and $R^3$ have the meaning set forth above, or with its functional equivalent as an acylating agent for a primary amino group. Such equivalents include the corresponding carboxylic acid bromides, acid anhydrides, including mixed anhydrides and particularly the mixed anhydrides prepared from stronger acids such as the lower aliphatic monoesters of carbonic acid of alkyl and aryl sulfonic acids and of more hindered acids such as diphenylacetic acid. In addition, an acid azide or an active ester or thioester (e.g. with p-nitrophenol, thiophenol, thioacetic acid) may be used or the free acid itself may be coupled with 6-aminopenicillanic acid by the use of enzymes or of a carbodiimide reagent [cf. Sheehan and Hess, J. Amer. Chem. Soc., 77, 1067, (1955)], or of alkynylamine reagent [cf. R. Buijle and H. G. Viehe, Angew. Chem. International Edition, 3, 582 (1964)], or of a ketenimine reagent [cf. C. L. Stevens and M. E. Monk, J. Am. Chem. Soc., 80, 4065 (1958)] or of an isoxazolium salt reagent [cf. R. B. Woodward, R. A. Olofson and H. Mayer, J. Am. Chem. Soc., 83, 1010 (1961)]. Another equivalent of the acid chloride is a corresponding azolide, i.e. an amide of the corresponding acid whose amide nitrogen is a member of a quasi-aromatic five-membered ring containing at least two nitrogen atoms, i.e. imidazole, pyrazole, the triazoles, benzimidazole benzotriazole and their substituted derivatives. As an example of the general method for the preparation of an azolide, N,N'-carbonyldiimidazole is reacted with a carboxylic acid in equimolar proportions at room temperature in tetrahydrofuran, chloroform, dimethylformamide or a similar inert solvent to form the carboxylic acid imidazolide in practically quantatative yield with liberation of carbon dioxide and one mole of imidazole. Dicarboxylic acids yield diimidazolides. The by-product, imidazole, precipitates and may be separated and the imidazolide isolated but this is not essential. The methods for carrying out these reactions to produce a penicillin and the methods used to isolate the penicillins so-produced are well-known in the art.

The novel ortho-(5-tetrazolyl)benzoic acids used in the present invention are prepared from the corresponding o-cyanobenzoic acids as exemplified below or according to the procedures given by Finnegan et al., J. Amer. Chem. Soc., 80, 3908–3911 (1958), or in E. H. Rodd, "Chemistry of Carbon Compounds," vol. IV, pp. 481–486, D. H. Van Nostrand Co., Inc., New York, N.Y., 1957, or in the references cited therein, for the preparation of 5-substituted-aryl-tetrazoles.

The necessary substituted o-cyanobenzoic acids are prepared, for example, as reported in the literature or by similar procedures or by simple saponification of the corresponding esters or by reaction of the correspondingly substituted phthalic acid or anhydride with thionyl chloride, phosphorus trichloride or the equivalent to form the corresponding phthaloyl chloride followed by reaction of the latter with ammonium hydroxide as exemplified below for o-cyanobenzoic acid itself according to the procedure of S. Hoogenwerf and W. A. Van Dorf, Rec. Trav. Chim. 11, 84–102 (1892), or in the references cited therein, to form the desired substituted o-cyanobenzoic acid.

Thus, use is made in the present invention, for example, of such substituted o-cyanobenzoic acids as 5-chloro-2-cyanobenzoic acid (C.A. 33, P176[9]), 2-cyano-4-ethoxy-3-methoxybenzoic acid (C.A. 31, 2186[4]), 2-cyano-4-methyl-3-methoxybenzoic acid (C.A. 15, 3835[2]), 2-cyano-4-methylbenzoic acid (2-cyano-p-toluic acid; C.A. 31, 674[1]), 2-cyano-3,5-diiodobenzoic acid (C.A. 45, 8480a), 2-cyano-6-methylbenzoic acid (6-cyano-o-toluic acid; C.A. 48, 3929g), 2-cyano-4,5-methylenedioxybenzoic acid (6-cyanopiperonylic acid; C.A. 4, 2480[9]), 2-cyano-5-iodobenzoic acid (C.A. 46, 3033h), 2-cyano-3,4,5-trimethoxybenzoic acid (C.A. 53, 287d) and 2-cyano-3,5,6-trimethylbenzoic acid (C.A. 56, 2311e and 57, 675b).

Substituted 2-cyanobenzoic acids for use in the present invention are also prepared by use of appropriately substituted reagents in the processes reported for 2-cyanobenzoic acid or simple esters thereof in the following publications: Beilstein's Handbuch der Organischen Chemie, Volume IX, System Number 973; C.A. 22, 4524[8]; C.A. 45, 422i; C.A. 57, 9780b; C.A. P11357f, U.S. Patent 3,094,551. Reference above to an abstract in Chemical Abstracts incorporates herein by reference the full text of the publication or patent of the abstract and also any pertinent references cited therein.

The following examples will serve to illustrate this invention without limiting it thereto. All melting points are uncorrected and all temperatures are given in degrees centigrade.

EXAMPLE 1

*Ortho-cyanobenzoic acid.*—A solution of 600 ml. concentrated ammonium hydroxide (8.88 moles) in 240 ml. water was placed in a two-liter three-necked flask equipped with a Herschberg stirrer and dropping funnel and cooled to 0° in an ice bath. Phthaloyl chloride (366 g., 1.80 moles) was added dropwise over a period of about one hour. One liter of water was then added to give a clear solution which was acidified to pH 2.0 with 300 ml. concentrated hydrochloric acid. The crude product, o-cyanobenzoic acid, precipitated as a white solid which was collected by filtration and essentially dissolved in 1.5 liters water containing 168 g. (2.0 moles) NaHCO₃. The solution was filtered to remove phthalimide and then acidified to pH 2.0 with about 600 ml. 3 N HCl to precipitate o-cyanobenzoic acid which was collected by filtration, air dried overnight and found to weigh 250.4 g. (96% yield), on heating to melt at 162–164° and on further heating to solidify and to melt again at about 226–230° and to exhibit the expected infrared absorption spectrum.

*Ortho-(tetrazol-5-yl)benzoic acid.*—A 2-liter, three-necked flask fitted with a stirrer and condenser was charged with ortho-cyanobenzoic acid (152 g., 1.03 M), sodium azide (81.3 g., 1.25 M), ammonium chloride (67 g., 1.25 M) and dimethylformamide 1560 ml.). The suspension was heated to 95–100° C. and stirred for a period of two hours following the general procedure of Finnegan et al. for the preparation of 5-substituted tetrazoles. After cooling and filtering off the sodium chloride, the reaction mixture was evaporated under reduced pressure to a syrup which was then treated with one liter of water. After filtering off the solids, the filtrate was acidified to pH 2, whereupon the crude product, ortho-(tetrazol-5-yl)benzoic acid, precipitated out. Three recrystallizations from six parts of hot water gave 95 g. or 48% of pure acid, M.P. 194–195°.

*Para-nitrophenyl ortho-(tetrazol-5-yl)benzoate.*—The method employed is essentially that described by Bodansky and Du Vigneaud, J. Amer. Chem. Soc. 81, 5688 (1959), for the preparation of other para-nitrophenyl esters. To a solution at 0° C. of ortho-(tetrazol-5-yl)benzoic acid (90 g., 0.474 M) and para-nitrophenol (79.5 g., 0.57 M) in dimethylformamide (500 ml.) was added a cold solution of dicyclohexyl-carbodiimide (97.5 g., 0.474 M) in dimethylformamide (200 ml.). The reaction mixture was allowed to stand at 0° C. for one hour and then at room temperature for one hour. After filtering and washing the precipitated dicyclohexyl urea with dimethylformamide, the filtrate and washings were treated with water (1300 ml.) whereupon the crude product, para-nitrophenyl ortho-(tetrazol-5-yl)benzoate, crystallized out. After collection and air drying, the material was recrystallized from ethanol to give 75 g. or 53% of pale yellow needles, M.P. 159–160° C.

*Di-potassium 6-[ortho-(tetrazol-5-yl)benzamido]penicillanate.*—6-aminopenicillanic acid (0.885 g., 4.1 mm.) was dissolved in dichloromethane (8 ml.) containing triethylamine (0.81 g., 8.2 mm.) by stirring at room temperature over a period of one hour. The volume of the solution was then reduced to one-half by evaporation under reduced pressure and a further quantity of triethylamine (0.81 g., 0.82 mm.) added. To the almost clear solution was then added para-nitrophenyl ortho-(tetrazol-5-yl)benzoate (1.28 g., 4.1 mm.) and, after complete solution was attained by shaking (10 minutes), the reaction mixture was left at room temperature. The reaction was followed by measuring the intensity of the penicillin amide absorption in the infrared. After 65 hours, the reaction was completed and the crude, very hygroscopic product was precipitated in the form of a thick yellow syrup by addition of dry ether (25 ml.). After cooling, the supernatant liquor was removed by decantation and the triethylammonium salt taken up in dichloromethane (10 ml.) and reprecipitated using dry ether. This procedure was repeated two more times and pale, slightly hygroscopic yellow, solid di-triethylammonium 6-[ortho-(5-tetrazolyl)benzamido]penicillanate was finally obtained (1.62 g. or 67% yield based on the ditriethylammonium salt).

The dipotassium salt was prepared by dissolving the above product in methanol (10 ml.), adding a 2.5 M solution of potassium 2-ethylhexanoate in n-butanol (3 ml.) followed by dry ether (30 ml.). The solid was separated in a centrifuge, taken up in methanol (5 ml.) and reprecipitated with ether. This procedure was repeated five times to give an almost colorless, slightly hygroscopic solid (0.87 g. or 70% based on the amount of triethylammonium salt used). The material contained a little methanol but was estimated to be 90% pure from the thin layer chromatogram, nuclear magnetic resonance and infrared spectra.

EXAMPLE 2

*Potassium 6-[ortho-(tetrazol-5-yl)benzamido]penicillanate.*—A larger batch was prepared in essentially the same manner as that described above. The 6-aminopenicillanic acid (21.6 g., 0.1 M) was dissolved at room temperature in dichloromethane (200 ml.) containing triethylamine (28.1 ml., 0.2 M). After complete dissolution, the concentration of the 6-aminopenicillanic acid was doubled by removal of approximately one half of the dichloromethane under reduced pressure. Para-nitrophenyl ortho-(tetrazol-5-yl)benzoate (31.1 g., 0.10 mole) was then added to the clear solution followed by more triethylamine (28.1 ml., 0.2 M) to replace any which was lost during the concentration step. The reaction mixture was shaken for half an hour during which time the active ester dissolved. After 65 hours at room temperature, the reaction mixture was treated slowly with dry ether (650 ml.), cooled and the precipitated gum rubbed to promote crystallization. After decantation of the mother liquor, the semi-solid material was redissolved in dichloromethane (100 ml.) and reprecipitated using dry ether (500 ml.). This procedure was repeated five times to give 62.6 g. of the triethylamine salt which still remained somewhat gummy. This salt was dissolved in methanol (150 ml.) and 2.5 M potassium 2-ethyl hexanoate in n-butanol (88 ml., 0.22 M) added. The dipotassium salt was precipitated using dry ether (800 ml.) and, after cooling, was removed by filtration. The hygroscopic solid was taken up in methanol and precipitated using dry ether (400 ml.). This procedure was repeated four times, three times of which the methanolic solution (before addition of ether) was treated with activated charcoal and filtered through diatomaceous earth ("Celite"). The final product, potassium 6-[ortho-(tetrazol-5-yl)benzamido]penicillanate, after drying under high vacuum, was only slightly hygroscopic and weighed 25 g. The purity was estimated to be in excess of 90% based on the nuclear magnetic resonance spectrum, thin layer chromatogram and infrared absorption spectrum.

EXAMPLE 3

Substitution in the procedure of Example 1 for the 2-cyanobenzoic acid used therein of an equimolar weight of 5-chloro-2-cyanobenzoic acid,
4-ethoxy-3-methoxy-2-cyanobenzoic acid,
4-methyl-3-methoxy-2-cyanobenzoic acid,
4-methyl-2-cyanobenzoic acid,
3,5-diiodo-2-cyanobenzoic acid,
6-methyl-2-cyanobenzoic acid,
4,5-methylenedioxy-2-cyanobenzoic acid,
5-iodo-2-cyanobenzoic acid,
3,4,5-trimethoxy-2-cyanobenzoic acid,
3,5,6-trimethyl-2-cyanobenzoic acid,
5-bromo-2-cyanobenzoic acid,
5-trifluoromethyl-2-cyanobenzoic acid,
4-trifluoromethyl-2-cyanobenzoic acid,
3-trifluoromethyl-2-cyanobenzoic acid,
5-nitro-2-cyanobenzoic acid,
3-nitro-2-cyanobenzoic acid,
4-nitro-2-cyanobenzoic acid,
4-methylsulfonyl-2-cyanobenzoic acid,
5-fluoro-2-cyanobenzoic acid, and
4-methylthio-2-cyanobenzoic acid, respectively to produce 5-chloro-2-(5'-tetrazolyl)phenylpenicillin,
4-ethoxy-3-methoxy-2-(5'-tetrazolyl)phenylpenicillin,
4-methyl-3-methoxy-2-(5'-tetrazolyl)phenylpenicillin,
4-methyl-2-(5'-tetrazolyl)phenylpenicillin,
3,5-diiodo-2-(5'-tetrazolyl)phenylpenicillin,
6-methyl-2-(5'-tetrazolyl)phenylpenicillin,
4,5-methylenedioxy-2-(5'-tetrazolyl)phenylpenicillin,
5-iodo-2-(5'-tetrazolyl)phenylpenicillin,
3,4,5-trimethoxy-2-(5'-tetrazolyl)phenylpenicillin,
3,5,6-trimethyl-2-(5'-tetrazolyl)phenylpenicillin,
5-bromo-2-(5'-tetrazolyl)phenylpenicillin,
5-trifluoromethyl-2-(5'-tetrazolyl)phenylpenicillin,
4-trifluoromethyl-2-(5'-tetrazolyl)phenylpenicillin,
3-trifluoromethyl-2-(5'-tetrazolyl)phenylpenicillin,
5-nitro-2-(5'-tetrazolyl)phenylpenicillin,
3-nitro-2-(5'-tetrazolyl)phenylpenicillin,
4-nitro-2-(5'-tetrazolyl)phenylpenicillin,
4-methylsulfonyl-2-(5'-tetrazolyl)phenylpenicillin,
5-fluoro-2-(5'-tetrazolyl)phenylpenicillin, and
4-methylthio-2-(5'-tetrazolyl)phenylpenicillin, respectively.

We claim:

1. A member selected from the group consisting of an acid of the formula wherein $R^1$, $R^2$ and $R^3$ each represent a member selected from the group consisting of hydrogen, fluoro, chloro, bromo, iodo, trifluoromethyl, (lower)alkyl, (lower)alkoxy, methylenedioxy, nitro, methylsulfonyl and (lower)alkylmercapto; and nontoxic pharmaceutically acceptable salts thereof.

2. 6-[ortho-(5-tetrazolyl)benzamido]penicillanic acid.
3. A triethylammonium salt of 6-[ortho-(5-tetrazolyl)benzamido]penicillanic acid.
4. A potassium salt of 6-[ortho-(5-tetrazolyl)benzamido]penicillanic acid.
5. 5-chloro-2-(5'-tetrazolyl)phenylpenicillin.
6. 4-methyl-2-(5'-tetrazolyl)phenylpenicillin.
7. 6-methyl-2-(5'-tetrazolyl)phenylpenicillin.

References Cited by the Applicant

UNITED STATES PATENTS

| | | |
|---|---|---|
| 2,941,995 | 6/1960 | Doyle et al. |
| 2,951,839 | 9/1960 | Doyle et al. |
| 2,985,648 | 5/1961 | Doyle et al. |
| 2,996,501 | 8/1961 | Doyle et al. |
| 3,174,964 | 3/1965 | Hobbs et al. |

FOREIGN PATENTS

| | | |
|---|---|---|
| 889,066 | 2/1962 | Great Britain. |
| 905,778 | 9/1962 | Great Britain. |
| 957,570 | 5/1964 | Great Britain. |

ALEX MAZEL, *Primary Examiner.*

JAMES W. ADAMS, JR., *Assistant Examiner.*